Feb. 18, 1941.        L. H. ANDERSON         2,231,984
GOPHER TRAP
Filed Aug. 13, 1940
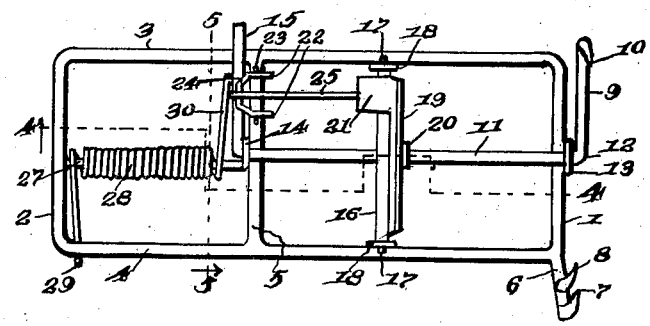
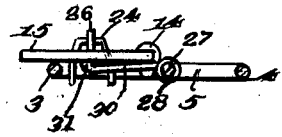
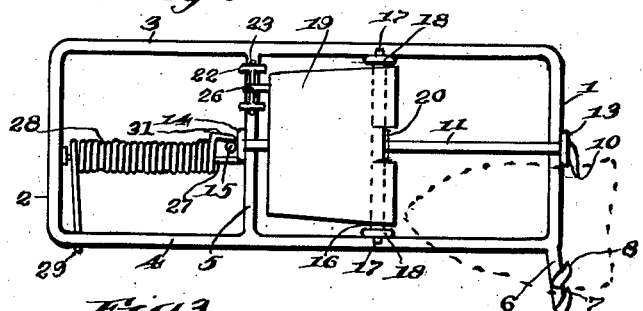
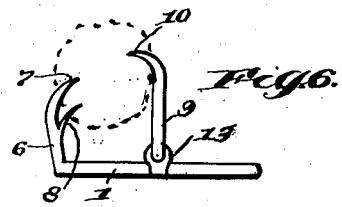
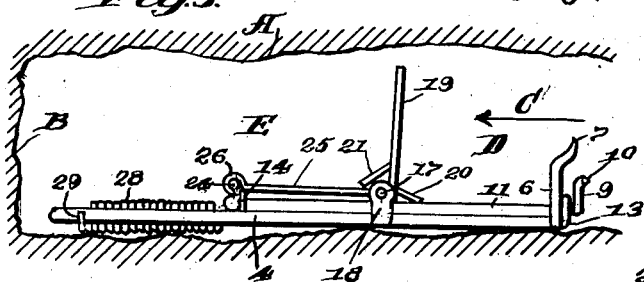
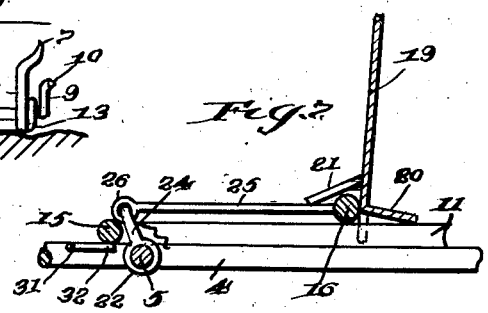
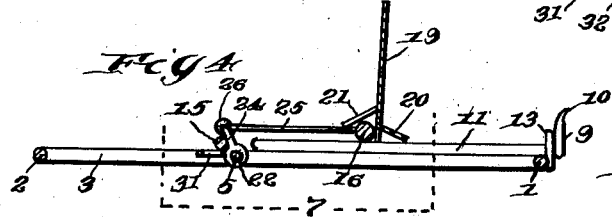
INVENTOR
Louis H. Anderson
BY
Carl H. Crawford
ATTORNEY Patented Feb. 18, 1941

2,231,984

UNITED STATES PATENT OFFICE 2,231,984

GOPHER TRAP

Louis H. Anderson, Springdale, Wash.

Application August 13, 1940, Serial No. 352,374

5 Claims. (Cl. 43—81)

This invention relates to improvements in animal traps and it is specifically constructed and proportioned for use in trapping gophers.

One of the features of this invention is to provide a gopher trap with impaling means and setting means, and to dispose a trigger plate between the two mentioned means and space the setting means away from the impaling means sufficiently so that the trap may be set without endangering the fingers of the user from injury by said impaling means, and whereby a trapped animal may be released from said impaling means by said setting means without necessitating any contact or handling of the animal by the user of the trap.

It is a feature of the invention to provide impaling means consisting of a fixed impaling element and a movable impaling element adapted for coaction in impaling a gopher, whereby only one actuating means and its connection is required for the single movable impaling element.

A further feature resides in disposing a novel trip and setting means in advance of the trigger plate, with respect to the direction in which the gopher comes out of its burrow, so that the gopher will actuate the trigger plate and will never reach the setting and trip means.

The invention has many other objects and features which will be more fully described in connection with the accompanying drawing and which will be more particularly pointed out in and by the appended claims.

In the drawing:

Fig. 1 is a plan view of the preferred form of this invention showing the trap in a set position.

Fig. 2 is a similar view with the parts shown after the trap has been sprung and illustrating the head of the gopher in dotted lines between the impaling elements.

Fig. 3 is a view in side elevation showing the trap in a set position and illustrating the manner in which it may be disposed in a burrow.

Fig. 4 is a sectional view on line 4—4 of Fig. 1.

Fig. 5 is a sectional view on line 5—5 of Fig. 1.

Fig. 6 is an end view looking from the right of Fig. 2.

Fig. 7 is an enlarged sectional view of the parts included in the dotted line bracket 7, of Fig. 4.

Like characters of reference designate similar parts throughout the different figures of the drawing.

The device of this invention includes a frame, which in the present construction is of elongated rectangular form with all the frame members occupying a single plane to thereby reduce the height of the trap as much as possible. I have shown the frame composed of rod-like members including end members 1 and 2, and side members 3 and 4, respectively. A transverse frame member is shown at 5, which may be connected with the side members 3 and 4, in any desired manner. Projecting from one corner portion of the frame is a fixed impaling element which may consist of a rod 6 having its end suitably bent and sharpened to form an impaling end 7. A second impaling member 8 projecting from said rod 6 may be provided, if desired.

Reference will next be made to the movable impaling element which coacts with the fixed impaling element to form the impaling means.

The movable element comprises a rod 9 having a curved end that is sharpened to form an impaling portion 10. This rod may form an integral part of a setting spindle 11 which extends longitudinally and substantially centrally of the frame, and the outer end of which is shown bent at 12 to form the impaling rod 9. A suitable bearing or eye 13, fixed to end frame member 1, forms one journal for spindle 11 and a like bearing or eye 14, fixed to transverse frame member 5, forms the remaining journal, whereby it will be seen that the spindle is rotatively mounted so that it can be oscillated from one position to the other. The remaining end of spindle 11, remote from element 9, is bent to form a setting arm 15, and this bend, together with the bend 12, will serve to retain spindle 11 against longitudinal movement relative to the frame, as will now be clear. It will be seen that arm 15, which constitutes the setting means, is bent at substantially right angles to spindle 11, and is accessible from one side or end of the frame that is remote from the side or end occupied by said impaling elements 8 and 10.

Reference will next be made to the improved trigger plate device, or means with which the trap is equipped.

A trigger shaft 16 has its ends reduced, as indicated at 17, and said ends are journalled in bearings such as eyes 18, suitably fixed to side members 3 and 4, whereby it will be seen that the shaft 16 is disposed in transverse relation to the frame. It will also be seen that shaft 16 is disposed in crossed relation to spindle 11 and above the latter. I provide shaft 16 with a trigger, which is shown in the form of a trigger plate 19, and said plate is shown attached in any suitable manner to one peripheral portion of the shaft, preferably to that peripheral portion remote from the arm 15. The width and height of trigger plate 19 will of course be optional but will be proportioned so that it will substantially form a partition in the usual size burrow. It may be stated that the views 1 to 6 of this drawing, in the original, show the trap actual size.

In order to prevent the trigger plate from being tilted beyond a set position, as shown in Fig. 3, stop means is provided which may take the form of a bent up portion 20, of said plate, which forms a lug or stop that is adapted for engagement with spindle 11 to limit movement of said plate 19 toward the right of Fig. 3, or in other words, beyond a set position. On the opposite side of plate 19 a portion thereof is struck up to form a guard 21, which serves to limit the positioning movement of a trip rod, to be presently described.

Reference will next be made to the trip mechanism which coacts with the trigger means just described.

A rocking link, which may be in the form of a U-shaped yoke is provided with eyes 22 which are disposed about and pivoted to said frame member or rod 5 and are held against longitudinal movement thereon by any suitable means such as pins 23. The bight of said U-shaped yoke is indicated at 24. A trip rod 25 has an eye 26 at one of its ends which surrounds and is pivoted to the bight 24 and forms an operative connection with said yoke. The remaining end of said trip rod is free and is adapted for engagement with an exposed peripheral surface of shaft 16, which is free from obstruction by reason of the fact that trigger plate 19 is secured to the far peripheral portion of said shaft. In order that the trap may be made very sensitive so as to be effective and responsive to the slightest impulse against plate 19, it is desirable that rod 25 should engage shaft 16 substantially on a line intersecting the longitudinal axis of said shaft, and not above such point, as will later appear. Hence, it is the function of guard 21 to limit the positioning of rod 25 so that it cannot be disposed in a position above the most effective position. It will be seen from Fig. 7 that when the trip rod 25 is in engagement with shaft 16, as in the set position, that the link 24 and eye 26 overhang arm 15 to retain the latter in the set position shown in Figs. 1 and 7.

Spring means is provided for causing the trap to spring when the trigger means is actuated, and I will next describe this spring means.

I have shown a rod 27 mounted on frame member 5 and end member 2. A coiled spring 28 is disposed about said rod 27 and has one end 29 engaged with frame member 4, and the remaining end 30 extends abreast of arm 15 and is bent at 31, and rigidly attached to arm 15 at 32 in any desired manner. It will be seen that this spring is tensioned and disposed in a manner to always exert thrust on arm 15 to quickly shift the latter from the set position shown in Fig. 1 to the sprung position shown in Fig. 2.

It will now be clear that the trip means consists of the rocking link 24 and trip rod 25, and that the setting means consists of the arm 15 which specifically is integral with spindle 11, and element 10, but which, broadly considered, is operatively connected with said spindle and element.

It is well known that gophers spend most of their life below the surface as their main diet is roots, and hence they burrow and close up the entrance to the passage, and only emerge to the surface occasionally. Thus, in practice the user of a gopher trap will open up the entrance to the burrow, and locate the trap therein and then close the entrance. Since these habits of gophers are so well known, I have merely indicated a portion of a burrow at A, which is shown horizontally disposed although usually it is inclined. The closed up entrance is indicated at B, and the direction of travel of the gopher out of the burrow is indicated by the arrow C.

It will now be clear that when the gopher investigates the reason for the presence of trigger plate 19, which substantially partitions off the burrow, it will pass between the open impaling elements 7 and 10 toward the trigger plate 19, and the slightest contact of the gopher's nose against plate 19 will spring the trap. It will also be clear that the setting and trip mechanism are on that side of plate 19, remote from the side thereof which the gopher approaches.

While the operation may be clear from the foregoing description, it will be briefly recapitulated as follows:

In setting the trap the operation of locating it will be clear from the foregoing, and it will be assumed that when the user starts to set the trap it will have been previously sprung, as shown in Fig. 2.

Therefore, the user will grasp the frame near the end frame member 2 with the fingers of one hand, and with the fingers of the other hand he will shift arm 15 down into the Fig. 1 position and then lift the strut trip rod 25 into a position so that its free end will engage shaft 16, as shown in Fig. 7.

At this point it is desired to emphasize the importance of guard 21 which prevents the end of rod 25 being located above the longitudinal axis of shaft 16, which would in that event require a far greater impulse against plate 19 than would be practical, in view of the fact that this trap is intended and constructed for such a small animal as a gopher. Of course guard 21, even with its great advantage, is not absolutely essential to successful operation of the trap since the user could, if very careful, locate the end of rod 25 in the correct position, but this guard avoids the necessity of exercising such care.

It will thus be seen that when the plate 19 is actuated by the animal, the only resistance against it being tilted from the position shown in Fig. 3, to the left, is the slight friction of the end of the rod 25 against the shaft 16, and when the plate 19 is thus tilted, the rod 25 is shifted out of contact with shaft 16 by the turning or rolling movement of the latter, which thus offers less resistance to tilting movement of the plate 19 than would be the case if the rod 25 had to be shifted out of a set position into a sprung position by being moved off from a stationary surface.

The parts are so proportioned that when the rod 25 is adjusted into a set position, as shown in Fig. 7, the link 24 is tilted to the left into overhanging relation with arm 15 in such a manner that said arm 15 is restrained against upward movement and is held down against frame member 3, in the set position shown in Fig. 1, against the action of spring 28. Thus, the trip rod 25 takes the stress in the manner of a strut and is released to spring the trap by rolling movement of the trigger means, consisting of the shaft 16 and trigger plate 19.

The body of a gopher is about from two and one-half to three inches long, and the plate 19 is disposed to the left of the impaling elements 7 and 10, far enough, viewing Fig. 3, so that said elements will engage the gopher near the ear portion of its head, which is the most vital part.

After the gopher has been caught, the trap can be removed, and it will not be necessary to handle the dead animal because the frame can be grasped by the fingers of one hand at a point remote from the trapped animal, and the arm 15 can be shifted into a set position, as shown in Fig. 1, and by shaking the frame the impaled animal will quickly be freed from the impaling elements.

Now it will be clear that the trap embodies what I may term an impaling section D, disposed to the right of plate 19, viewing Fig. 3, and a setting section E, disposed to the left, or on the opposite side of plate 19 from that on which the impaling section D is located.

It will also be clear that since only one impaling element is movable, I do not have to provide actuating means for both elements, and consequently the spindle 11 can be formed integral with element 10, and integral with the setting arm 15, which is a matter of great saving in construction.

It will be seen that my improved trip means comprises jointed members one of which is pivoted to the frame, and that said members are so constructed and proportioned that when one member is adjusted into engagement with the trigger plate shaft, the remaining member will automatically be shifted into engagement with the setting arm in a manner to restrain the latter against trip movement.

It is believed that the invention will be clear from the foregoing description, and while I have shown and described one embodiment of the invention, I do not want to be limited thereto except for such limitations as the claims may import.

I claim:

1. In a gopher trap, an elongated frame, a trigger plate shaft rotatively mounted on said frame and disposed transversely thereof, a trigger plate mounted on said shaft and provided with means for limiting tilting movement of said plate beyond a set position, impaling means comprising an impaling element fixed to said frame on one side of said trigger plate and a coacting impaling element having a setting spindle rotatively mounted on and extending longitudinally of said frame beyond said trigger plate shaft and provided with a setting arm, a spring normally actuating said arm to shift said coacting impaling element toward said fixed impaling element to impale a gopher, a rocker link mounted on said frame to engage said arm, and a strut trip rod having one end pivoted to said link and having a free end adapted for engagement with said trigger plate shaft and causing engagement of said link and rod with said arm to retain the trap in a set position until said trigger plate is actuated.

2. In a gopher trap, an elongated frame, a trigger plate shaft rotatively mounted on said frame in transverse relation thereto, a trigger plate mounted on said shaft and provided with means for limiting tilting movement of said plate beyond a set position, impaling means comprising an impaling element fixed to said frame on one side of said trigger plate and a coacting impaling element having a setting spindle rotatively mounted on and extending longitudinally of said frame beyond said trigger plate shaft and provided with a setting arm, a spring normally actuating said arm to shift said coacting impaling element toward said fixed impaling element to impale a gopher, and trip means interposed between said trigger plate shaft and said arm to retain the trap in a set position until said trigger plate has been actuated.

3. In a gopher trap, a frame structure equipped with impaling means, a trigger plate device tiltably mounted on said frame and having a movable shaft surface, a spring actuated setting arm operatively connected with said impaling means, and trip means comprising a link movably mounted on said frame and movable against said arm when the latter is in a set position, and a trip rod having a free end adapted for engagement against said shaft surface and the remaining end of said rod having an eye connected with said link and adapted to overhang said arm to retain the latter in a set position until the free end of said rod has been released by movement of said trigger plate device.

4. In a gopher trap, a frame structure equipped with impaling means, a trigger plate device tiltably mounted on said frame and having a trip surface movable with said device, a spring actuated setting arm operatively connected with said impaling means, and jointed trip means comprising a member pivoted to said frame and a member for trip engagement with said trip surface, said members being constructed and proportioned to cause one member to engage and arrest trip movement of said setting arm when the remaining member is adjusted into engagement with said trip surface.

5. In a gopher trap, a frame structure equipped with impaling means, a trigger plate device tiltably mounted on said frame and having a trip surface movable with said device, a spring actuated setting arm operatively connected with said impaling means, and a jointed trip means comprising a member pivoted to said frame and a member for trip engagement with said surface, said members being constructed and proportioned to cause one member to engage and arrest trip movement of said arm when the remaining member is adjusted into engagement with said trip surface, and said trigger plate device having means for limiting adjustment of the member engaging said surface beyond a predetermined extent.

LOUIS H. ANDERSON.